United States Patent [19]

Anello et al.

[11] Patent Number: 5,787,158
[45] Date of Patent: Jul. 28, 1998

[54] SMART BUCKET

[75] Inventors: Salvatore Anello, Highland; Albert F. Diaz, Lynbrook, both of N.Y.

[73] Assignee: Sandt Technology, Ltd., Marlboro, N.Y.

[21] Appl. No.: 604,101

[22] Filed: Feb. 20, 1996

[51] Int. Cl.$^6$ ...................................... H04M 17/00
[52] U.S. Cl. .......................... 379/145; 379/148; 379/150; 379/152; 379/155; 232/64; 232/66; 194/347; 194/349
[58] Field of Search ...................... 379/145–155; 232/7, 14–15, 64–66; 194/202–204, 347–349

[56] References Cited

U.S. PATENT DOCUMENTS

| | | |
|---|---|---|
| 1,887,576 | 11/1932 | Bollinger. |
| 2,004,615 | 6/1935 | Mills. |
| 3,813,500 | 5/1974 | Roberts. |
| 4,326,103 | 4/1982 | Oehrig. |
| 5,018,193 | 5/1991 | DeArkland ...................... 379/145 |
| 5,524,143 | 6/1996 | Turk et al. ...................... 379/143 |

*Primary Examiner*—Curtis A. Kuntz
*Assistant Examiner*—Duc Nguyen
*Attorney, Agent, or Firm*—Joseph B. Taphorn

[57] ABSTRACT

Apparatuses and methods immediately alert a telephone company or other owner/host or operator of a payphone that a vandalizing stuffing has occurred, thereby enabling it or him or her promptly to dispatch a maintenance person to the particular payphone or station to fix it. Stuffing sensing switches are advantageously mounted in a coin return mechanism, and in electromechanical payphones electrically connected to the telephone company central office over one of the existing RING and TIP wires connecting the stuffed or compromised payphone with the central office. Conventional testing techniques periodically employed in the office by the telephone company over the existing wit. installation will then sense whether a payphone has been compromised or stuffed. In electronic payphones, a payphone computer monitors the sensing switches and calls the owner/host or operator to report a problem or gives a local alarm.

17 Claims, 7 Drawing Sheets

SMART BUCKET

FIELD OF THE INVENTION

This invention relates generally to anti-stuffing devices for coin-operated pay telephones or payphones, and more particularly to apparatus for notifying the owner or operator of the pay telephone that the coin return mechanism of the telephone has been stuffed.

BACKGROUND OF THE INVENTION

Coin-operated pay telephones include arrangements for returning the deposited coins to callers unable to reach a dialed number. These coin return arrangements include a coin return mechanism to which coins are directed from a coin chute upon energization of a relay controlling a switch upon hanging up of the receiver handset on its hook, which hanging activates a switch thereat.

The coin return mechanisms of pay telephones in use today provide a coin return chute and a coin return bucket having a front opening mounting a door swung inwardly at its bottom by a finger being inserted to retrieve the deposited coins and a back opening for pushing out into the main body of the telephone foreign material deposited in the bucket. They typically are formed by a hollow body having front and back walls and top and bottom walls which are joined by opposing side walls. An intermediate wall is situated between the top and bottom walls and extends from a point on the back below the top wall, downwardly toward the front wall to define with the top wall and the side walls a throat constituting the coin return chute. The bottom wall of the hollow body extends rearwardly from the front wall, first downwardly and then upwardly toward the back wall. It thus forms with the intermediate and side walls a trough portion or bucket for receiving coins from the chute, the trough extending below and forwardly and rearwardly of the throat or chute.

The front wall of the hollow body is provided with the vertical front opening normally closed by a door swung inwardly at its bottom. The door is horizontally pivoted at its upper end. The finger of a would-be-caller displaces the lower end of the door and extends into the bucket to retrieve returned coins discharged into the trough or coin return bucket from the throat or coin return chute. The rear wall of the body is provided with a vertical opening constituting the back opening of the bucket and emptying into the body of the telephone. It is closed by an outwardly vertically swinging door hinged at the top.

An opening at the rear of the top wall of the hollow body constitutes the top opening of the throat or coin return chute. This opening receives coins which are being returned to a caller from the payphone's coin chute below its relay switch. After the coins being returned pass through this top wall opening, they fall onto the intermediate wall of the throat or coin return chute and slide downward and forward to the trough or bucket at the bottom wall for retrieval by the caller.

Coins are appropriated by thieves or vandals using "stuffing" techniques. Stuffing is a continuing problem and has been a serious one for many years. According to one stuffing technique, the vandal inserts a compressible obstruction through the hollow-body front wall opening, and into the trough or bucket so as to block the lower end of the throat or coin return chute. The obstructing material is typically cotton or polyester wadding, paper, fabric or plastic sheeting, and is used to prevent the coins which would otherwise be returned to the payphone user from falling through the coin return chute and into the trough or bucket.

After sufficient time for a sizable number of coins to accumulate behind the obstructing material, the vandal returns to remove the blockage and allow the coins to cascade into the trough or bucket. The vandal effects blockage removal either manually or using implements such as a stiff wire, pick or hook, or by igniting and burning it (a technique which damages the payphone's internal mechanisms). The stiff wire would be used to push the stuffing out the back opening of the bucket; the pick or hook to pull it out the front one and perhaps use it again. The vandal retrieves the coins from the trough or bucket in usual finger insertion fashion.

The payphone stuffing problem is an old one. This criminal problem has cost the phone companies, and in turn the public, enormous sums of money. While the phone companies would not have normally collected the money lost to the "stuffers" in properly working payphones because the coins were being returned for non-completed calls, the phone companies usually do refund the money not retrieved by their irate customers. Furthermore, each phone company must employ personnel to investigate payphones failing to return change, employ maintenance workers to examine and repair "stuffed" phones, and have accounting and payment systems in place to refund lost money claimed by payphone users. The overall administrative cost of repairing damaged payphones and refunding lost money, therefore is quite high. A substantial need exists for an inexpensive device which discourages stuffing and which can be quickly and simply installed.

Early attempts at preventing the type of theft described above centered around designing the payphone coin return mechanism in such a way that it became disabled when the chute was stuffed. See U.S. Pat. Nos. 1,887,576; 1,901,944; 1,921,071; 1,921,072; and 2,004,615. Although disabling the coin return mechanism prevented the theft of coins, it also made it impossible to return coins to the caller in the event a call was not completed. Disabling the coin return mechanism was not an entirely satisfactory solution to the theft problem, since it was not feasible to return the coins to a caller immediately. The returning of money for incomplete telephone calls would require an additional message to an operator and the forwarding a check to the caller. This process was very costly and inefficient.

More recent attempts to prevent this type of theft involved designing a return chute which is more difficult to stuff. In particular, the back wall of the chute below the intermediate wall was brought forward, reducing the area of the trough available for a thief to work in when attempting to insert the stuffing material. The back wall was replaced by an opening closed by a pivoting door so that the obstructing material might pass out of the chute. These modifications however, did not prove fully successful and there was still a need for a more effective way of preventing the stuffing of payphone coin return chutes.

U.S. Pat. No. 4,761,809 describes another attempt to design an "unstuffable" coin return mechanism. A tubular member having pointed teeth at its front end was inserted into the coin return door. A blade having additional sharpened teeth was attached to the lower surface of the intermediate wall of the throat. These teeth were intended to slice up obstructing material so it could not form blockages but actual usage of this modification revealed rather that the teeth facilitate stuffing because they catch and hold the stuffing material.

Still another attempt to design an "unstuffable" coin return device is described by the present inventors in U.S.

Pat. Nos. 4,966,325; 4,946,095; and 5,102,038. A roughly P-shaped sealing plate was attached to the back of the coin return door. When the coin return door is pushed open to allow the user to retrieve a returned coin, the sealing plate blocks the coin return chute and prevents the insertion of obstructing material. However, another problem has been uncovered. It has been found that if the coin return door is pushed open before the coins are returned, coins, particularly dimes, sometimes lodge between the sealing plate and the return chute side walls causing the sealing plate to jam in the return chute. As a result, the phone companies still incur the costs of refunding the non-returned coins, investigating the reports of payphones failing to return change, and repairing the jammed payphones.

U.S. Pat. No. 5,018,193 describes yet another attempt to inhibit the stuffing of coin return chutes by providing mechanical gating devices within the coin return mechanism. In particular, a first gate plate is attached to the inside bottom portion of the coin return door such that it extends into the coin return trough. In addition, a second gate plate hangs downward from the the front edge of the bottom wall of the coin return chute such that the first and second gate plates combine to close off access to the coin return chute when the coin return door is opened. Although these gate plates are intended to permit the return of coins while preventing a thief from stuffing obstructing material into the coin return chute, it has been found that coins passing through the return chute tend to lodge between the side walls of the return chute and the gates, thereby jamming the door closed and preventing the coins being returned from being retrieved by the payphone user.

Another method of "stuffing" a payphone involves running a string from the payphone coin insert slot down through the coin return mechanism to the coin return trough such that the thief can attach a small bag to the string and pull the bag up into the coin return chute to catch returned coins. Accordingly, a thief will drill a hole in a coin and tie a string to it through the hole. Then the thief will insert the coin into the payphone unit coin entry slot and let the coin to pass down through the telephone and into the coin return mechanism such that the coin drops into the return trough or bucket. Once the coin and attached string fall into the trough, the thief detaches the coin and attaches instead a bag to the string and then pulls via the upper end of the string sticking out of the coin entry slot the bag up into the coin return chute to block coins being returned to the user.

Some thieves or vandals also resort to blocking the payphone coin return chutes by bending the coin return door and jamming it into the coin return chute such that the returned coins accumulate in the coin return chute behind the stuck return door.

It has also been found that vandals or frustrated thieves insert explosive devices such as firecrackers, cherry bombs or M-80's in the coin return trough or bucket and cause serious damage to the payphone unit.

To make matters worse, coin return chutes are frequently jammed for some time before the vandalism comes to the attention of the telephone company or other owner or operator of the payphone and can be repaired.

Coin operated nay phones owned by telephone companies (TELCOs) and known as the mechanical type, are line powered station utilizing a battery in the telephone company central office. Two lines or wires connect the payphone with the central office; one, the TIP side, and the other the RING side. The normal electrical condition of the wires as seen from the central office is ground on the TIP wire and battery on the RING side.

Telephone companies periodically test the wires of each payphone. Thus the TIP wire is tested to see if it is at ground, and the RING wire to see if it is at battery voltage. If a situation other than as expected is detected, e.g. ground on the RING wire, the testing apparatus will cause the payphone line number to be printed out on the ALIT machine and reported to the coin payphone repair department which will dispatch a repairman.

So-called electronic style coin payphones, those owned by COCOTs, already use a number of switches to alert the telephone company or other owner/host or operator that the upper payphone housing is off, that the bank or vault is out of the payphone, or that the handset is cut off. The electronic pay phone is locally powered as from a nearby 110 volt AC line. It has on-board a computer that monitors the condition of the switches and when trouble is detected sends a signal over its TIP and RING lines to the central office which in turn signals the personal phone and/or computer of the owner/host or operator over his TIP and RING wires that the payphone has trouble. In other words the owner/host or operator is informed of the trouble via a phone call originated by the payphone computer.

A new type of "anti-stuffing" coin return mechanism is shown in patent application Ser. No. 08/595,619 filed Feb. 2, 1996 by the instant inventors. The anti-stuffing coin return mechanism of that application involves removing the floor at the end of the coin return chute to create a floor opening, placing a wall over the opening at the end of the chute to stop coins coming down the chute, pivotally mounting at the bottom end of the wall a compound lever so that its one leg closes-off the floor opening when in a first position towards which it is biased, and attaching one end of a compression spring to-the other leg of the compound lever and its other end to the bottom of the pivoted door normally closing-off the front opening to the coin return bucket. The spring is of such length that when the bucket door is closing-off the front opening it yieldably urges the compound lever to its first position closing-off the floor opening, and when the lower end of the bucket door is pushed inward it pushes the compound lever so that its one leg moves away from the floor opening and allows the pay telephone user's coins for uncompleted calls to be retrieved by him.

SUMMARY OF THE INVENTION

It is therefore an object of the invention to provide an improved apparatus and method for minimizing "stuffing" of coin operated payphones.

A more particular object of the invention is to provide an improved apparatus and method for alerting and dispatching repair technicians to a vandalized phone.

It is another object of the invention to facilitate the retrieval of returned coins by payphone users.

It is a further object of the invention to reduce the number of disgruntled payphone users.

It is yet another object of the invention to minimize the revenue loss to a telephone company or other owner or operator of a payphone from non-use of payphones user-known to be operating improperly.

It is an additional object of the invention to provide an improved anti-stuffing coin return mechanism which can be quickly and simply installed in existing payphones.

It is a further additional object of the invention to provide an improved anti-stuffing coin return mechanism which is inexpensive of construction and easy of manufacture.

The objects of the invention are achieved through the provision of new apparatuses and methods for immediately alerting the telephone company or other owner or operator of a payphone that a stuffing has occurred, thereby enabling it or him or her promptly to dispatch a maintenance person to the particular payphone or station to fix it. Stuffing sensing switches are advantageously mounted in a coin return mechanism, and electrically connected to the telephone company central office over the existing wire installation already connecting the stuffed or compromised payphone with the central office. Conventional testing techniques periodically employed for electromechanical payphones by the telephone company over the existing wire installation, or computer monitoring continually employed for electronic payphones by owner/host or operators, will then indicate whether a payphone has been compromised or stuffed.

As noted above, the rear wall of the hollow body of standard coin return mechanisms in use today, is provided with an outwardly swinging vertically door in the back opening of the bucket. A stuffing sensing switch is to be mounted on the inside of the bucket back door. It detects any stuffing inserted into the coin return bucket and pushed all the way into the bucket. The sensing switch is electrically connected for electromechanical payphones to place a ground on the RING wire which will be detected on both wires the next time the payphone wiring is tested by the central office to generate a trouble report; for electronic payphones it places a ground on computer monitor.

Also as noted above, standard coin return mechanisms in use today involve a hollow body having a coin return chute and a coin return bucket. An intermediate wall in the hollow body is situated between the top and bottom walls and extends from a point on the back below the top wall, downwardly toward the front wall to define with the top wall and the side walls a throat constituting the coin return chute that terminates in a forwardly looking opening out of which coins fall into the coin return bucket. A stuffing sensing switch may be mounted on the underside of the intermediate wall near the chute forwardly looking opening. It detects small amounts of stuffing inserted into the coin return bucket and left near the chute opening to block the flow of coins into the bucket from the chute. This sensing switch too, for electromechanical payphones, may be electrically connected to place a ground on the RING wire which will be detected on it as well as the TIP wire the next time the payphone wiring is tested by the central office; for electronic payphones, it places a ground on the computer monitor.

Also as noted above, another method of "stuffing" a payphone involves pulling a small bag by a string up into the coin return chute to catch returned coins there. Thus a snuffing sensing switch may be mounted on the inside wall of the coin return chute near its lower opening. It detects any stuffing pulled into the coin return chute and pushed all the way into the bucket. The sensing switch too is electrically connected to place system ground on the RING wire which will be detected on it as well as she TIP wire the next time the payphone wiring is tested by the central office; in an electronic payphone, it places system ground on the computer monitor.

The sensing switches are of pressure sensitive designs. They involve a broad plate which can be moved by stuffing material to open or close circuits as the choice may be. These circuits may involve the RING and TIP wires tested by the central office or those that sound or light a local alarm. With electronic payphones, the computer monitoring or self diagnosing set, when stuffing occurs will notify the host over the telco network that there is a ground indicating that material was stuffed in the coin return mechanism.

BRIEF DESCRIPTION OF THE SEVERAL VIEWS OF THE DRAWINGS

These and other objects, features and advantages of the invention will become apparent from a reading of the following detailed description of preferred embodiments of the invention, when considered with the appended drawings wherein.

DETAILED DESCRIPTION OF PREFERRED EMBODIMENTS OF THE INVENTION

Figure 1:
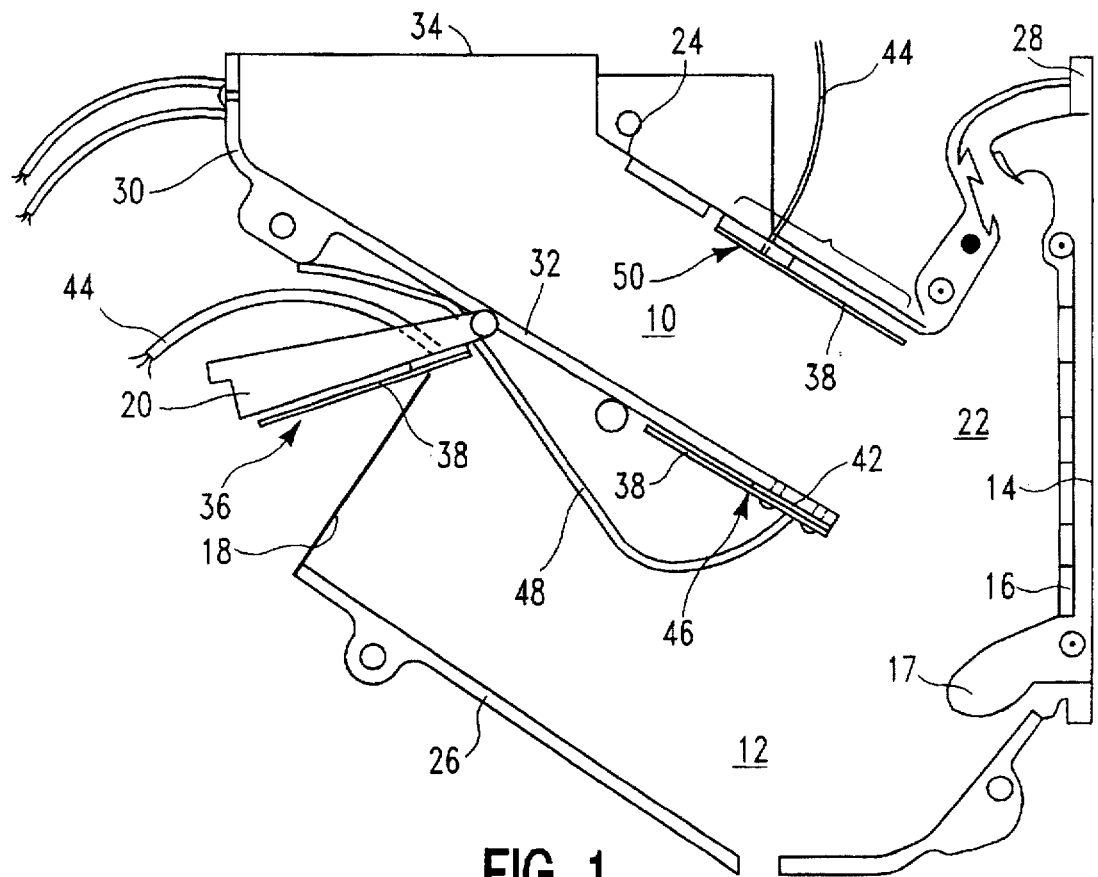
FIG. 1 is a side elevational cross-sectional view of a conventional coin-operated pay telephone equipped according to the invention with three "stuffing" sensors and its front coin return door in closed position.
Figure 2:
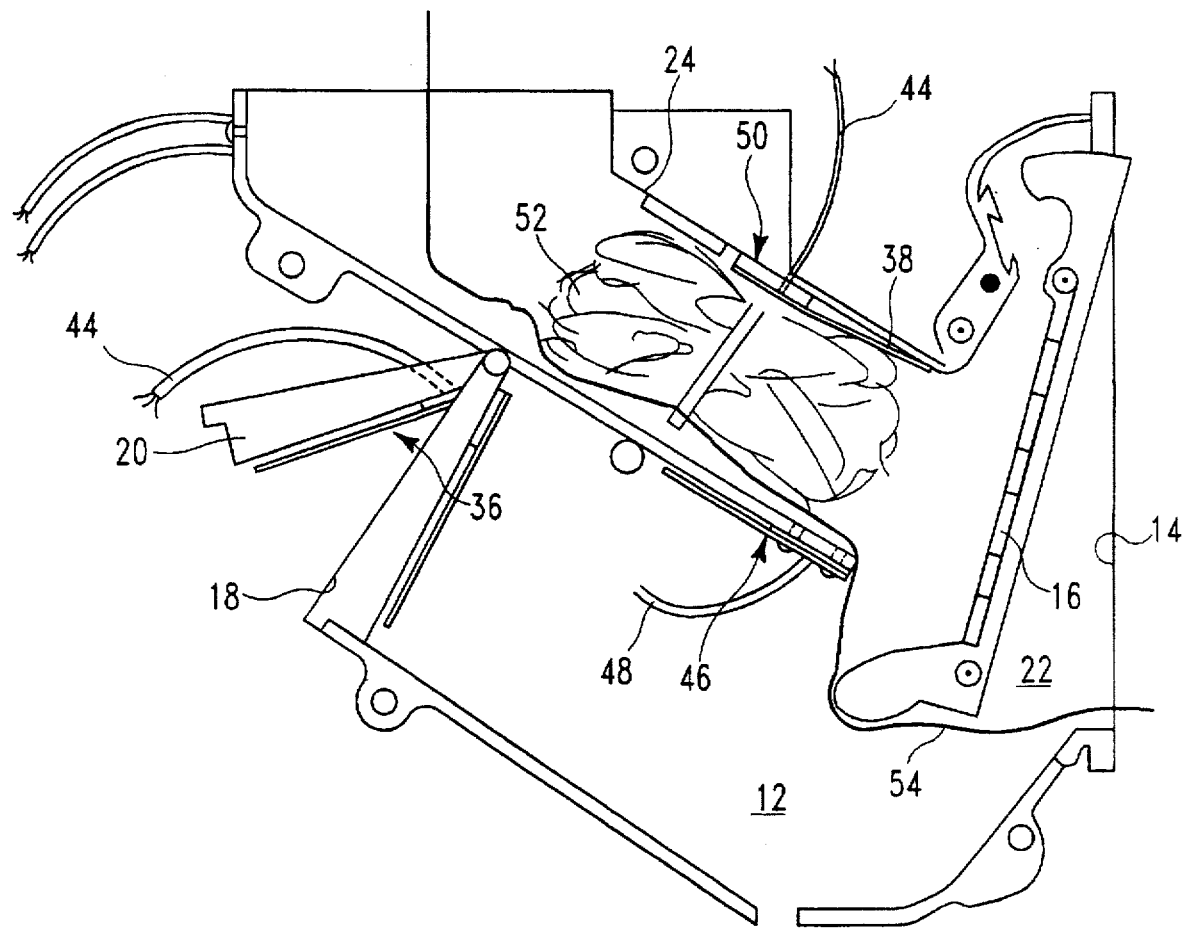
FIG. 2 is a similar view but with a "stuffing" placed in the coin return chute and the front coin return door in open position.

Referring now more particularly to FIGS. 1 and 2 of the drawings, there is shown therein a coin return mechanism of a pay telephones in general use today. It is provided with a coin return chute generally indicated by the numeral 10 and a coin return bucket generally indicated by the numeral 12. It has a front opening 14 mounting a door 16 swung inwardly at its bottom by a finger being inserted in the opening 14 to retrieve the deposited coins being returned, and a back opening 18 for pushing out into the main body of the telephone foreign material deposited in the bucket. The back opening 18 is normally closed by a metal door 20 presently used to prevent coins being returning to the customer through the coin return bucket 12, from bouncing out the rear of the unit through the opening 18 into the main body of the telephone. The door 20 is pivotally mounted at its top for outward swinging movement at its bottom.

The coin return mechanism is constructed as a metal hollow body having front and back walls 22 and top and bottom walls 24 and 26 which are by opposing front and rear side walls 28 and 30. The opening 14 is in the front side wall 28, and the opening 18 in the back side wall 30. An intermediate wall 32 is situated between the top and bottom walls 24 and 26, and extends from a point on the back wall 30 below the top wall 24 downwardly toward the front wall 28 to define with the top wall and the side walls a throat constituting the coin return chute 10. The bottom wall 26 of the hollow body extends rearwardly from the front wall 28, first downwardly and then upwardly toward the back wall 30. It thus forms with the intermediate and side walls 32 and 22 the trough portion or bucket 12 for receiving coins from the chute 10, the trough 12 extending below and forwardly and rearwardly (where the intermediate wall is the roof) of the exit or end opening of the throat or chute 10.

As noted earlier, the front wall 28 of the hollow body is provided with the vertical opening 14. It normally is closed by the door 16 pivotally mounted at its upper end. Its lower end is swing inwardly by a finger of a caller inserted to retrieve returned coins discharged into the trough or coin return bucket 12 from the throat or coin return chute 10; it is of a length sufficient to block off the discharge end of the chute 10 when in its inward position. A tubular member 17 may extend inwardly from the bottom of the coin return door 16 to push any inserted stuffing material rearwardly and out the back opening 18 if present in sufficient amount.

An opening 34 a the rear of the top wall 34 of the, hollow body constitutes the top opening of the throat or coin return chute 10. This opening 34 receives coins which are being returned to a caller from the payphone's coin chute (not shown) below its relay switch. After the coins being returned pass through this top well opening 34, they fall onto the intermediate wall 32 of the throat or coin return chute 10 and slide downward to the trough or bucket 12 at the bottom wall 26, for retrieval by the caller.

Figure 3:
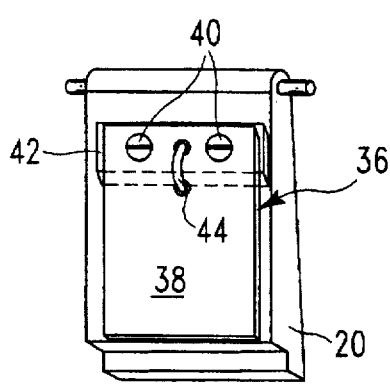
FIG. 3 is a view in perspective of the front of a "stuffing" sensor.
Figure 4:
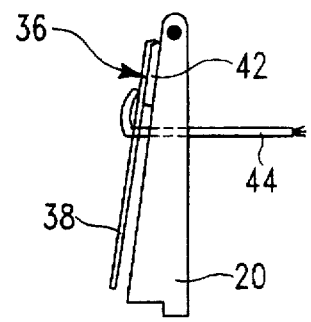
FIG. 4 is a side view of the "stuffing" sensor of FIG. 3.
Figure 5:
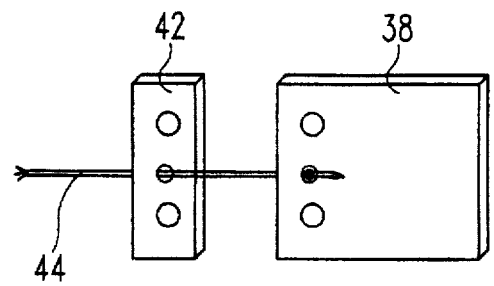
FIG. 5 is an exploded view of an electrical portion of the "stuffing" sensor.

A stuffing sensing switch generally indicated by the numeral 36, is mounted at its upper end on the upper end of the metal door 20 at the back end of the bucket 12. The pressure-sensitive switch 36 is made up of three parts. One part 38 (see FIGS. 3–5 too), a flexible solid metal tab, is slightly smaller (three-fourths) in length and width (almost full width) than the door 20. It is attached to the door by two nylon non-conductive screws 40 and so that its movable free end is pointed downwards to avoid intercepting stuffing material being pushed out through the bucket back opening 18 after the lower end of the door 20 has been swung backwards and upwards.

A non-conductive spacer 42 is placed between the conductive flexible solid metal tab 38 and the conductive metal door 20. Holes the center of tee non-conductive spacer and in the metal door 20 pass a plastic covered wire 44 having electrical connection with the RING wire. Since the coin return mechanism, and hence the metal door 20, is at system electrical ground in a conventional coin-operated payphone station, flexing of the lower end of the flexible metal tab 38 (by stuffing extending into the far end of the bucket 12) into contact with the metal door 20, results in the application through the wire 44 of the system ground to the RING wire and its sensing as an abnormality at the next central office periodic test of the RING wire.

A second stuffing switch generally indicated by the numeral 46, is mounted on the lower end of the extended wall 32 in the middle of the unit. Thus it is placed near the discharge end of the chute 10, with its flexible metal tab 38 facing downward so that it will be displaced upward into contact with the extended wall 32 at system ground in the event of its being deflected by stuffing being forced into the bucket 12. The metal tab's free end is shown as extending upward so as to avoid catching any coins being discharged from the chute 10. Its components are essentially the same as those of the stuffing switch 36, one critical difference being that its wire 48 does not pass through its non-conductive space 42 (to avoid it blocking coins in the chute 10), but rather extends directly from the tab 38 downwards and outwards through a suitable opening in the rear wall 30 to its electrical rendezvous with the central-office-connected RING wire.

A stuffing third switch generally indicated by the numeral 50, is located in the discharge end of the chute 10 and actuatable by stuffing 52 (FIG. 2) which has been pulled into the chute as by tugging on the upper end of the string 54 and whose lower end would normally be used to withdraw the stuffing 52. The switch 50 is mounted on the top wall 24 of the coin return mechanism in the same manner that switch 36 was on the door 20. The free end of its flexible metal tab 38 extends downward so as not to intercept any descending coins. The tab 38 is sufficiently flexibility that the introduction of the stuffing 52 into the chute presses its free end against the system grounded top wall 24 and causes system ground to be applied via its wire 44 to the central-office-connected RING wire.

One and/or both of the switches 46 and 50 may be actuated when thieves or vandals resort to blocking the payphone coin return chutes by bending the coin return door and jamming it into the coin return chute such that the returned coins would accumulate in the coin return chute behind the stuck return door. Switch 46 may be crushed by the jamming of the door 16 into the end of the chute 10 so that switch is closed. If the switch 46 does not signal the jamming action, the build-up of coins in the lower end of the chute will actuate the switch 50 as if stuffing material were present.

One or more of the switches 36, 46, and 50 may signal that vandals or frustrated thieves inserted explosive devices such as firecrackers, cherry bombs or M-80's in the coin return trough or bucket and caused serious damage to the payphone unit. Thus one or more of the switches 36, 46, and 50 may have the free end of the its tab 38 displaced by the explosion to reflect the vandalism and indicate immediately the need for repair.

Figure 6:
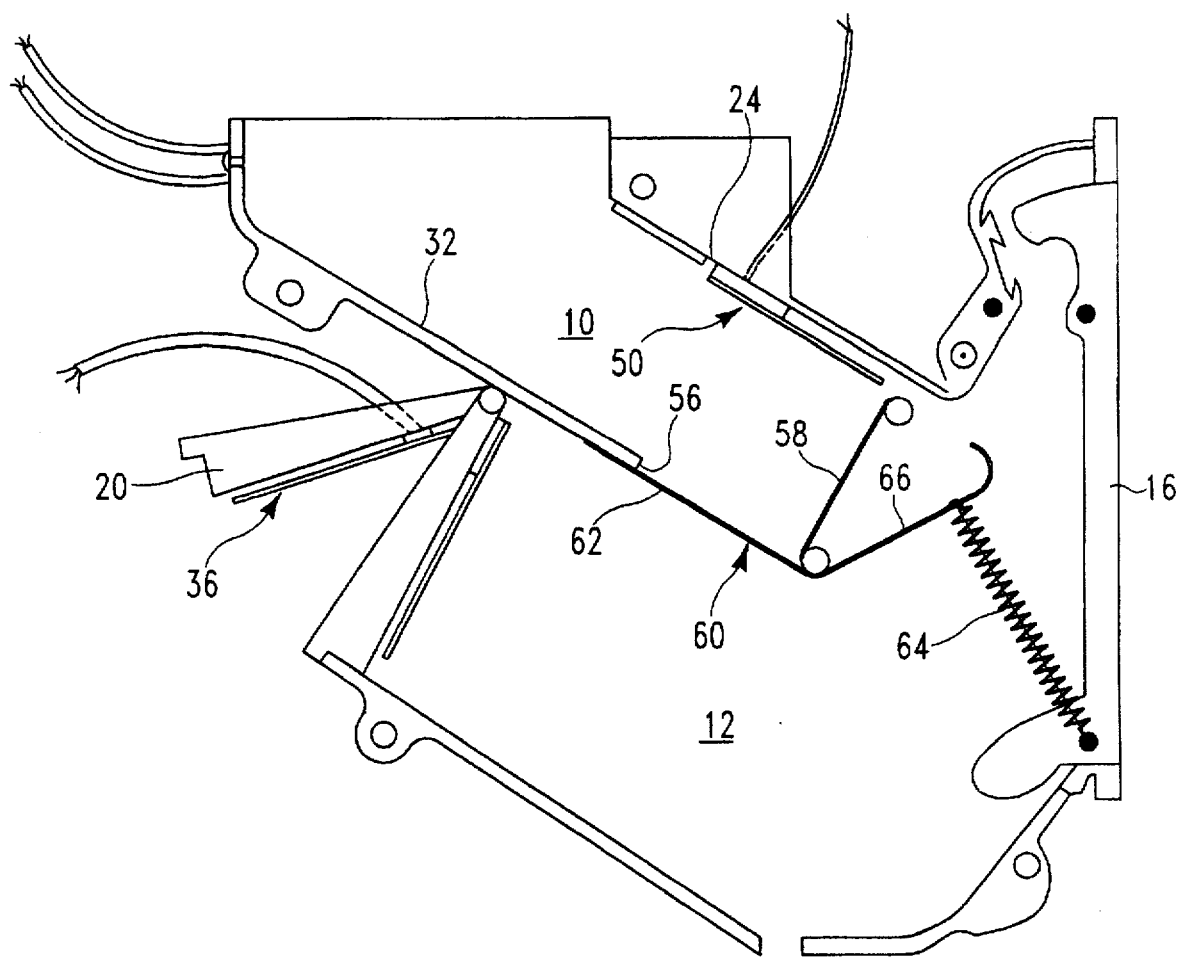
FIG. 6 is an elevational cross-sectional view of a recent coin return mechanism equipped according to the invention, but with just two "stuffing" sensors.

FIG. 6 shows the recent coin return mechanism identified above equipped according to the invention, but with just two "stuffing" sensors. That coin return mechanism involves removing the end of the intermediate wall 32 or floor at the end of the coin return chute 10 to create a floor opening 56, placing a wall 58 over the opening at the end of the chute 10 to stop coins coming down the chute, pivotally mounting at the bottom end of the wall a compound lever generally indicated by the numeral 60 so that its one leg 62 closes-off the floor opening 56 when in a first position towards which it is biased, and attaching one end of a compression spring 64 to the other leg 66 of the compound lever 60 and its other end to the bottom of the pivoted door 16 normally closing-off the front opening to the coin return bucket 12. The spring 64 is of such length that when the bucket door 16 is closing-off the front opening, it yieldably urges the compound level 60 to its first position closing-off the floor opening 56 and when the lower end of the bucket door is pushed inward it pushes the compound lever 60 so that its one leg 62 moves away from the floor opening 56 and allows the pay telephone user's coins for uncompleted calls to be retrieved by him.

A first stuffing switch generally indicated by the numeral 36, is mounted on the back door 20 of the recent coin return mechanism as it was for the conventional coin return mechanism.

A second stuffing switch generally indicated by the numeral 50, is mounted on the top wall 24 and in the lower end of the coin chute as the third stuffing switch 50 was for the conventional coin return mechanism.

Figure 7:
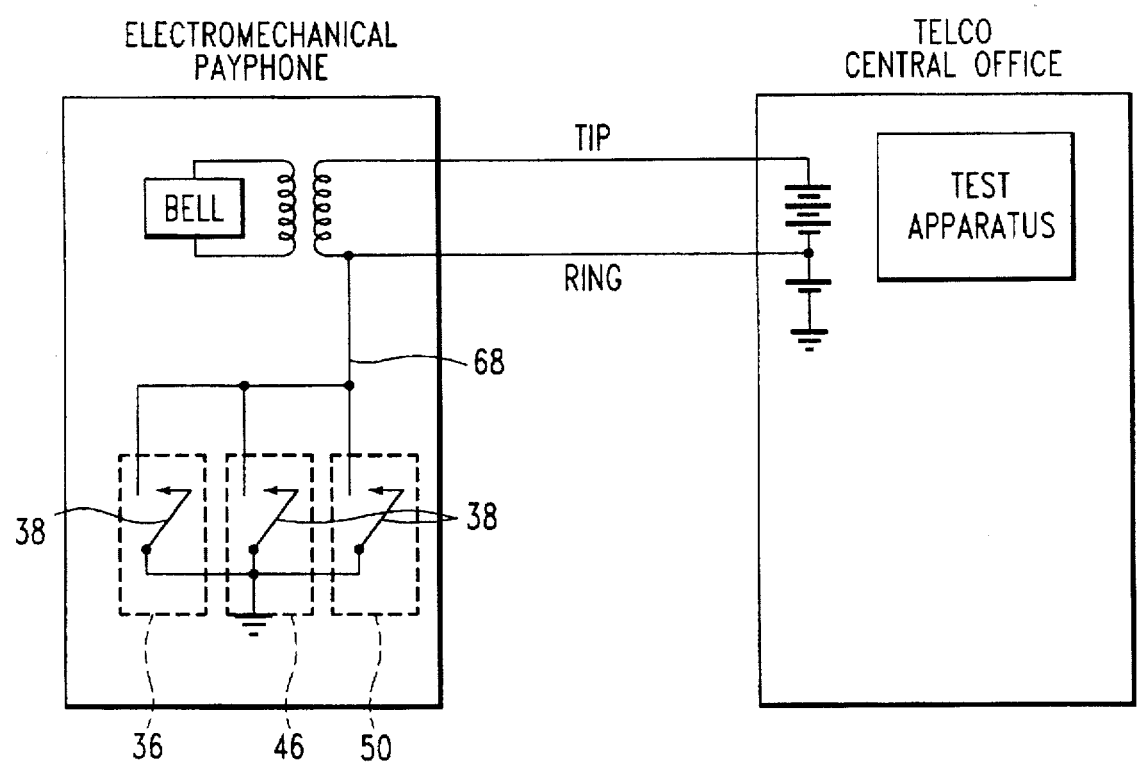
FIG. 7 is a wiring diagram showing representative connections including RING and TIP wires, of an electromechanical payphone with its stuffing sensing switches according to the invention and with a TELCO central office equipped with periodic line testing equipment.

FIG. 7 shows shows representative electrical connections including RING and TIP wires between an electromechanical payphone equipped with stuffing sensing switches according to the invention and a central office equipped with periodic line testing equipment. The flexible metal tabs 38 of switches 36, 46, and 50 connected in parallel, each function as a normally open switch which places system ground via a common wire 68 on the RING wire when closed by the presence of stuffing material. Test equipment in the central office will detect the system ground when periodically testing the TIP and RING wires. As a situation other than as expected is detected, i.e. system ground the RING wire, the testing apparatus will cause the payphone line number to be printed out on the ALIT machine and repairman.

Figure 8:
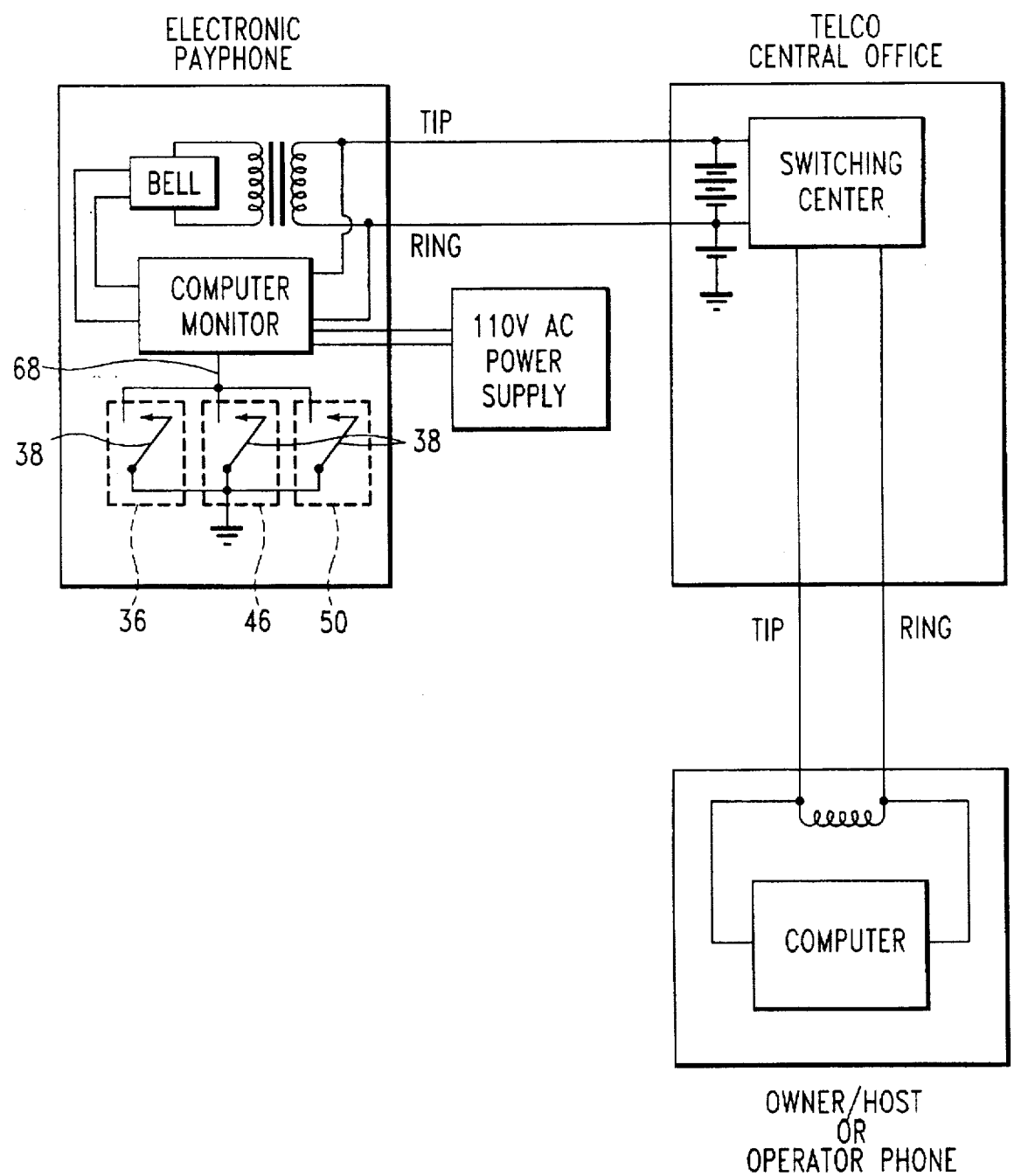
FIG. 8 is a wiring diagram showing representative connections including RING and TIP wires, of an electronic payphone with its computer monitor and with its stuffing sensing switches according to the invention, connected with the personal telephone of the owner/host or operator through a TELCO central office.

FIG. 8 shows representative electrical connections including RING and TIP wires, of an electronic payphone with its stuffing sensing switches according to the invention and with the personal telephone/computer of the owner/host or operator through a TELCO central office. The flexible metal tabs 38 of switches 36, 46, and connected in parallel, each function as a normally open switch which places system ground via the common wire 68 on the computer monitor when closed by the presence of stuffing material. The computer monitor responds to the system ground to call via the usual telephone network the personal phone of the owner/host or operator and signal that the payphone is in need of maintenance. A local 110 volt power supply supports the computer monitor. The computer monitor may also give a local alarm, as by energizing the payphone bell.

Figure 9:
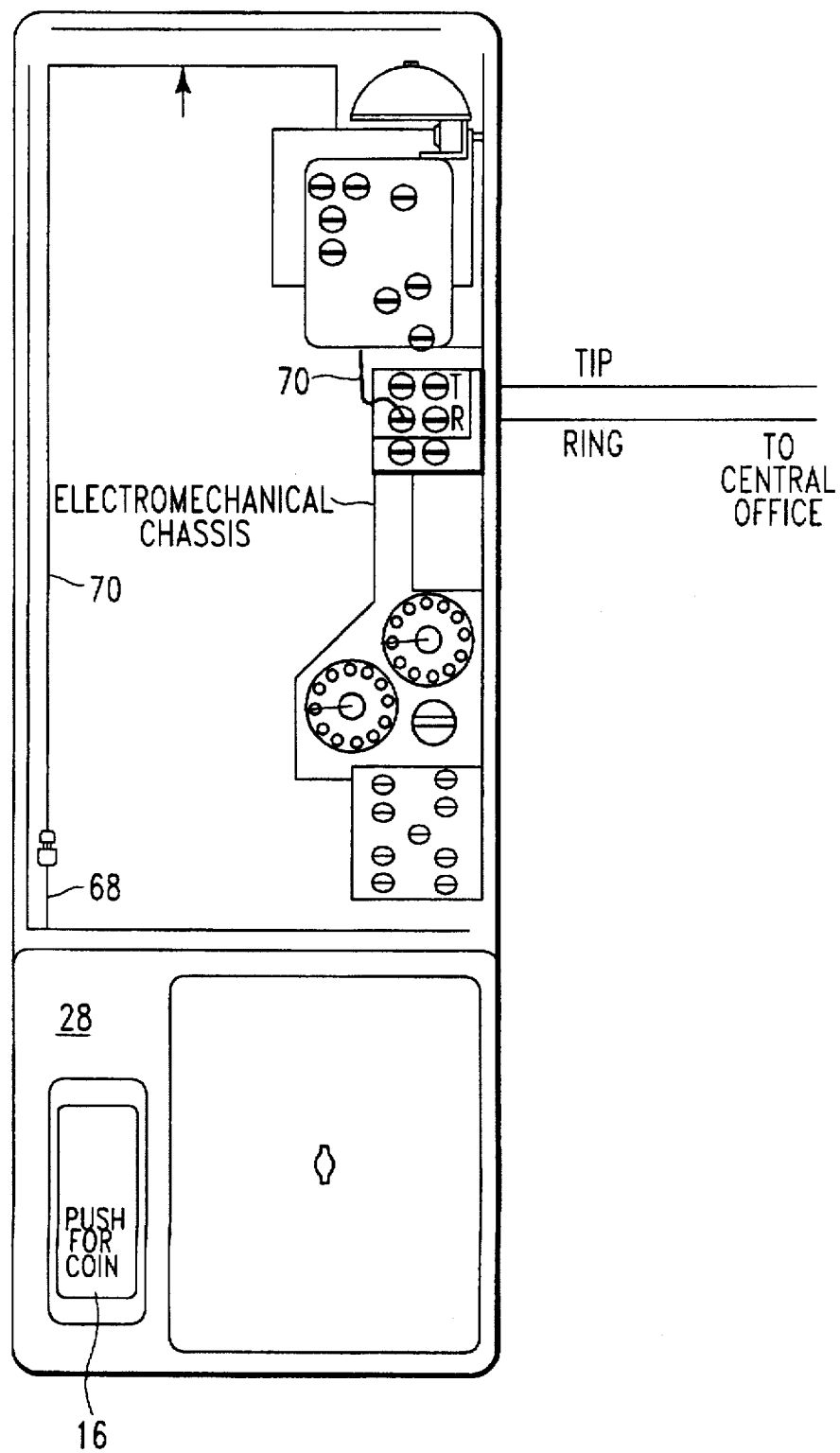
FIG. 9 is a diagrammatic front view of a common electromechanical payphone with the upper housing removed to show its chassis and the wiring connections involved in installing the instant invention.

FIG. 9 shows the details of installing the instant invention in a common electromechanical payphone. The upper housing of the payphone has been removed to expose its chassis and the particular wiring connections including those for the TIP and RING wires and their terminals. The wire 68 connected to a sensing switch is shown coming up from the coin return mechanism behind the front wall 28, through an existing opening in the top of the lower housing. It free end is provided with a female connector of a modular plug. The female connector receives a modular plug male connector at the bottom of a length of wire 70 running up the left side of the payphone in the rear. At the top of the payphone, the wire 70 crosses over to the right side, its free end connecting to the chassis on the ring side. Should the coin return mechanism in the bottom of the payphone be damaged, the old lower wire 68 from the coin return mechanism would be uncoupled at the modular plug, the coin return mechanism replaced, and its new sensing switch wire 68 connected at the modular plug. The wire 70 would not need to be otherwise disturbed.

Figure 10:
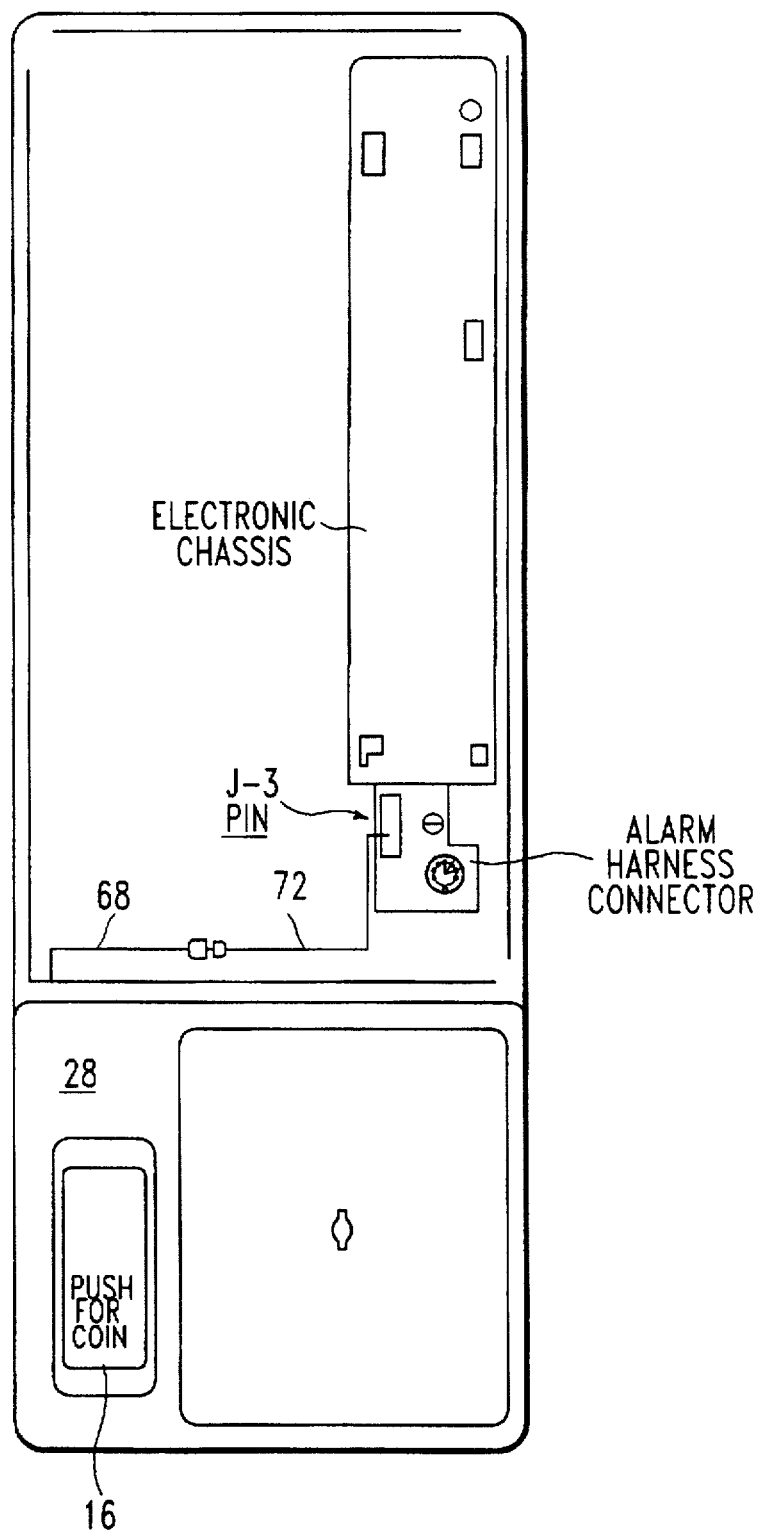
FIG. 10 is a diagrammatic front view of a common electronic payphone with she upper housing removed to show its chassis and the wiring connections involved in installing the instant invention.

FIG. 10 shows the details of installing the instant invention in a common electronic payphone. The upper housing of the payphone has been removed to show its chassis and particular wiring connections including the chassis J-3 pin. The wire 68 connected to at least one sensing switch is shown coming up from the coin return mechanism behind the front wall 28, through an existing opening in the top of the lower housing. Its free end is provided with a female connector of a modular plug. The female connector receives a modular plug male connector at the end of a length of wire 72 running across the bottom to the right and up to the terminal J-3 in the alarm harness connector. Should the coin return mechanism in the bottom of the payphone be damaged, the old lower wire 68 from the coin return mechanism would uncoupled at the modular plug, the coin return mechanism replaced, and its new sensing switch wire 68 connected at the modular plug. The wire 72 would not need to be otherwise disturbed.

It can be seen that there has been provided an improved apparatus and method for minimizing "stuffing" of coin operated payphones; that the invention facilitates the retrieval of returned coins by payphone users by discouraging vandals; that the invention will reduce the number of disgruntled payphone users; and that the invention will minimize the revenue loss to a telephone company or other owner or operator of a payphone and hence indirectly to the public, from non-use of payphones user-known to be operating improperly.

It will he appreciated that these pressure-sensitive stuffing switches may be employed singly or in any combination, and that other kinds of switches may be substituted. Also that the switches need not be employed to apply system ground to the RING wire, but that other electrical arrangements may be employed such as those involving the opening of circuits and short circuits; thus normally closed switches could be connected in series in either or both of the TIP or RING wires to open those circuits on insertion of stuffing material; alternatively, normally open switches could be inserted in parallel with a current limiting resistor across the TIP and RING wires to short circuit them on insertion of stuffing material. Further that stuffing detection need not be done by the central office, but rather may involve local detection that sets off of alarms of one kind or another as fits the situation or telephones the owner/host or operator.

What is claimed is:

1. A coin return mechanism for a coin-operated payphone, comprising a bucket for receiving coins being returned to a payphone user, a chute for discharging coins into the bucket, and at least two spaced-apart switches positioned to be actuated by discrete stuffings placed in the coin return mechanism to prevent retrieval of returned coins by the user, wherein the switches are an electrical ones, wherein the electrical switches are pressure sensitive ones, wherein the bucket has a back door swingable outward at its bottom, and a pressure sensitive electrical switch is mounted on the inside of the back door.

2. A coin return mechanism according to claim 1, wherein the back-door pressure sensitive electrical switch has a movable element whose free end is pointed downward.

3. A coin return mechanism for a coin-operated payphone, comprising a bucket for receiving coins being returned to a payphone user, a chute for discharging coins into the bucket, and at least two spaced-apart switches positioned to be actuated by discrete stuffings placed in the coin return mechanism to prevent retrieval of returned coins by the user, wherein the switches are an electrical ones, wherein the electrical switches are pressure sensitive ones, wherein the bucket has a roof, and a pressure sensitive electrical switch is mounted inside the bucket on its roof.

4. A coin return mechanism according to claim 3, wherein the roof pressure sensitive electrical switch has a movable element whose free end is pointed rearward.

5. A coin return mechanism for a coin-operated payphone, comprising a bucket for receiving coins being returned to a payphone user, a chute for discharging coins into the bucket, and at least two spaced-apart switches positioned to be actuated by discrete stuffings placed in the coin return mechanism to prevent retrieval of returned coins by the user, wherein the switches are an electrical ones, wherein the electrical switches are pressure sensitive ones, wherein the chute has a top wall, and a pressure sensitive electrical switch is mounted inside the chute on its top wall.

6. A coin return mechanism according to claim 5, wherein the chute pressure sensitive electrical switch has a movable element whose free end is pointed rearward and upward.

7. A coin return mechanism according to claim 1, wherein the bucket has a roof, and the second pressure sensitive electrical switch is mounted inside the bucket on its roof.

8. A coin return mechanism according to claim 7, wherein the chute has a top wall, and a third pressure sensitive electrical switch is mounted inside the chute on its top wall.

9. A coin return mechanism according to claim 1, wherein the chute has a top wall, and the second pressure sensitive electrical switch is mounted inside the chute on its top wall.

10. A coin return mechanism according to claim 3, wherein the chute has a top wall, and second pressure sensitive electrical switch is mounted inside the chute on its top wall.

11. A coin return mechanism according to claim 2, wherein the bucket has a roof, and the second pressure sensitive electrical switch is mounted inside the bucket on its roof and has a movable element whose free end is pointed rearward, and wherein the chute has a top wall, and a third pressure sensitive electrical switch is mounted inside the chute on its top wall and has a movable element whose free end is pointed rearward and upward.

12. A coin return mechanism according to claim 2, wherein the chute has a top wall, and the second pressure sensitive electrical switch is mounted inside the chute on its top wall and has a movable element whose free end is pointed rearward and upward.

13. A coin return mechanism for a coin-operated payphone, comprising a bucket for receiving coins being returned to a payphone user, a chute for discharging coins into the bucket, and at least two spaced-apart switches positioned to be actuated by discrete stuffings placed in the coin return mechanism to prevent retrieval of returned coins by the user, wherein the switches are electrical ones, wherein the electrical switches are pressure sensitive ones, and a system having RING and TIP wires and responsive to the activation of either one of the pressure sensitive electrical switches for reflecting the stuffing of the coin return mechanism by applying system ground from the bucket to one of the RING and TIP wires.

14. A coin return mechanism according to claim 13, wherein the system gives off a local alarm.

15. A coin return mechanism according to claim 13, wherein the system includes a central office connected to the payphone and periodically testing the pressure sensitive electrical switches and giving out a signal when an activated pressure sensitive switch is detected.

16. A coin return mechanism according to claim 15, wherein the central office is connected to the payphone by RING and TIP wires, and switch connects the RING wire to system ground when it is activated.

17. A coin return mechanism according to claim 13, wherein the system includes a computer monitor in the payphone responsive to the activation of the pressure sensitive electrical switch to signal via a central office connected to the payphone a computer of the owner/host or operator.

* * * * *